United States Patent [19]

Petisce

[11] Patent Number: 5,539,849
[45] Date of Patent: Jul. 23, 1996

[54] OPTICAL FIBER CABLE AND CORE

[75] Inventor: James R. Petisce, Suwanee, Ga.

[73] Assignee: AT&T Corp., Murray Hill, N.J.

[21] Appl. No.: 296,554

[22] Filed: Aug. 26, 1994

[51] Int. Cl.⁶ .................................................. G02B 6/44
[52] U.S. Cl. ........................................... 385/102; 385/107
[58] Field of Search ...................................... 385/102, 103, 385/106–108

[56] References Cited

U.S. PATENT DOCUMENTS

| | | | |
|---|---|---|---|
| 4,156,104 | 5/1979 | Mondello | 174/70 R |
| 4,504,112 | 3/1985 | Gould et al. | 385/102 |
| 4,522,464 | 6/1985 | Thompson et al. | 385/107 |
| 4,538,881 | 9/1985 | Anctil et al. | 385/107 |
| 4,629,285 | 12/1986 | Carter et al. | 385/102 X |
| 4,900,126 | 2/1990 | Jackson et al. | 385/114 |
| 4,902,097 | 2/1990 | Worthington et al. | 385/103 |
| 4,960,318 | 10/1990 | Nilsson et al. | 385/103 |
| 5,007,703 | 4/1991 | Hale et al. | 385/102 |
| 5,222,177 | 6/1993 | Chu et al. | 385/105 |
| 5,224,190 | 6/1993 | Chu et al. | 385/107 |
| 5,259,055 | 11/1993 | Cowen et al. | 385/102 X |
| 5,293,442 | 3/1994 | Sayegh | 385/102 |

*Primary Examiner*—John D. Lee
*Attorney, Agent, or Firm*—Donald E. Hayes

[57] ABSTRACT

In accordance with the present invention, an annular insulating core member is formed from an elastomeric material surrounding a plurality of optical fibers and maintaining the group of fibers in a predetermined configuration relative to each other. More specifically, the elastomeric material is characterized by its modulus at room temperature and its bonding to each color identified optical fiber being such as to hold together said fiber configuration while allowing interfiber movement and to facilitate the exposure of the individual optical fibers upon the application of peeling forces between the elastomeric material and an optical fiber without obfuscating the color identification of the optical fibers while providing suitable mechanical properties to maintain the integrity of the fiber configuration. Additionally, the insulating core member may be incorporated into a communication cable by enclosing the core member into a sheath system with an associated strength member. For applications with high strength demands, such as undersea environments, the cable strength members may include a central elongated filament and plural layers of stranded steel wires separated from the central filament by the annular insulating core member, in which the optical fibers are embedded. Furthermore, a metallic tubular jacket preferably surrounds the stranded steel layers to provide both a DC path for powering the optical repeaters and a hermetic moisture barrier for the fibers.

20 Claims, 2 Drawing Sheets

OPTICAL FIBER CABLE AND CORE

TECHNICAL FIELD

The invention relates to an optical fiber assembly and associated cables and core. More particularly, to the use of an improved radiation curable elastomeric material to establish an assembly of optical fibers for potential use in cables adapted for broadband communication, particularly submarine cables.

BACKGROUND OF THE INVENTION

The well-known broadband characteristics of optical fibers make such fibers a prime candidate for intercontinental and other undersea communications. Additionally, for such intercontinental and other undersea applications, which most often cover significant lengths, it is important to employ a transmission system that requires relatively few repeaters per given distance. However, such applications of course require that the fiber core unit be incorporated into a cable design that provides adequate protection from the various environmental elements likely to be experienced by a cable used in such intercontinental and other undersea applications.

One major problem inhibiting the use of optical fibers in a submarine cable is the necessity of hermetic protection of the fibers against moisture. This is particularly significant because of the mechanical stresses on a submarine cable during laying and recovery, since the combination of moisture and stress on an optical fiber has been found to quickly lead to structural failure. Moreover, a fiber-bearing cable must provide an efficient DC path for powering the optical repeaters in the system and must be sufficiently strong to withstand the above-mentioned stresses and years of operation at sea.

The reconciliation of all of these requirements in a single submarine cable has up to now been somewhat less than desirable with regard to at least some features. For example, while certain manufacturers presently offer multi-element optical fiber arrays which are arranged in cable form (including strength members and packing), such designs cannot reliably withstand the pressures and stresses of operation at sea, nor are they sufficiently waterproof to prevent deleterious moisture penetration to the fibers. Specific examples of existing cable designs for undersea applications are set forth in commonly assigned U.S. Pat. Nos. 5,222,177 and 5,224,190 issued in the name of Chu et al., on Jun. 22, 1993 and Jun. 29, 1993 respectively.

However, another specific cable design presently used by the assignee of the present application is disclosed in commonly-assigned U.S. Pat. No. 4,156,104 issued on May 22, 1979 in the name of Mondello, and is incorporated by reference herein. In particular, the immediately aforementioned patent discloses a repeatered submarine cable having a composite inner conductor for accommodating a system of optical fibers therein. The cable strength members include a central elongated filament and plural layers of stranded steel wires separated from the central filament by an annular insulating core member, in which the optical fibers are embedded. More specifically, the annular insulating member set forth is a polyether polyester elastomer supplied under the designation HYTREL™ by the Dupont Corporation. Additionally, a metallic tubular jacket surrounds the stranded steel layers to provide both a DC path for powering the optical repeaters and a hermetic moisture barrier for the fibers.

While the cable design described above offers advancement over previously available designs, there remains a continuous effort to improve additional characteristics of the various sections of the cable in order to enhance the overall operation of the communications cable. One particular area of aggravation associated with the use of HYTREL™ as the annular insulation material is that when fiber splicing becomes necessary, an operator in the field must use a chemical solution to remove the HYTREL™ to gain appropriate access to the fibers. At present, the particular chemical most often used by industry is methylene chloride, $CH_2Cl_2$. The use of this chemical is not only messy and cumbersome but, also may damage some solvent-based color codings that may be applied to the fiber. Therefore, many of the color-coding techniques presently used throughout the industry are left ineffective after treatment with common chemicals, particularly $CH_2Cl_2$. In addition, the use of methylene chloride, $CH_2Cl_2$ introduces certain health and/or safety concerns that must be addressed in order to appropriately protect an operator from harm when directly exposed to such material. In summary, requiring an operator to use such a treatment on the fiber to properly prepare it and to allow adequate access to the individual fibers for fiber splicing, establishes a substantial burden and inconvenience for the operator and also greatly interferes with the operational effectiveness of the overall communication cable.

The present invention overcomes the above-stated problems with existing cable designs by utilizing a elastomeric material as an annular insulating layer. Notably, the preferred elastomeric material used in accordance with the present invention provides significant improvements over the materials used in cables now available. More specifically, the sought-after cable structure includes a material around the fiber which exhibits sufficient inter fiber mobility to allow movement of the fibers during handling and installation without damaging the fiber structure. Also, the sought-after structure should be mechanically rugged to withstand cabling operations and plowing of the cable into the ground during installation and should exhibit acceptable loss performance at temperatures as low as $-40°$ F. Notwithstanding these requirements, the fiber configuration should be compact in size, and be strippable with access to the individual optical fibers from any end of the fiber configuration, or from midspan, without removing any coloring material from the fibers and without the need for complex tools.

SUMMARY OF THE INVENTION

The foregoing shortcomings of the prior art have been overcome by the use of an optical fiber assembly constructed in accordance with the present invention. An optical fiber assembly has a composite inner conductor for accommodating a system of optical fibers therein. In accordance with the present invention, the assembly includes an annular insulating core member formed from a radiation curable elastomeric material surrounding a plurality of optical fibers and maintaining the group of fibers in a predetermined configuration relative to each other. More specifically, the elastomeric material is characterized by its modulus at room temperature and its bonding to each color identified optical fiber being such as to hold together said fiber configuration while allowing interfiber movement and to facilitate the exposure of the individual optical fibers upon the application of peeling forces between the elastomeric material and an optical fiber without obfuscating the color identification of the optical fibers while providing suitable mechanical properties to maintain the integrity of the fiber configuration.

Additionally, the optical fiber assembly may be incorporated into a communications cable by adding a sheath system and any necessary strength components. For cable applications with high strength demands, such as in undersea or submarine environments, the cable strength members may include a central elongated filament and plural layers of stranded steel wires separated from the central filament by the annular insulating core member, in which the optical fibers are embedded. Furthermore, in an undersea cable design, a metallic tubular jacket preferable surrounds the stranded steel layers to provide both a DC path for powering the optical repeaters and a hermetic moisture barrier for the fibers.

BRIEF DESCRIPTION OF THE DRAWING

The invention is further set forth in the following detailed description taken in conjunction with the appended drawing, in which.

DETAILED DESCRIPTION

Figure 1:
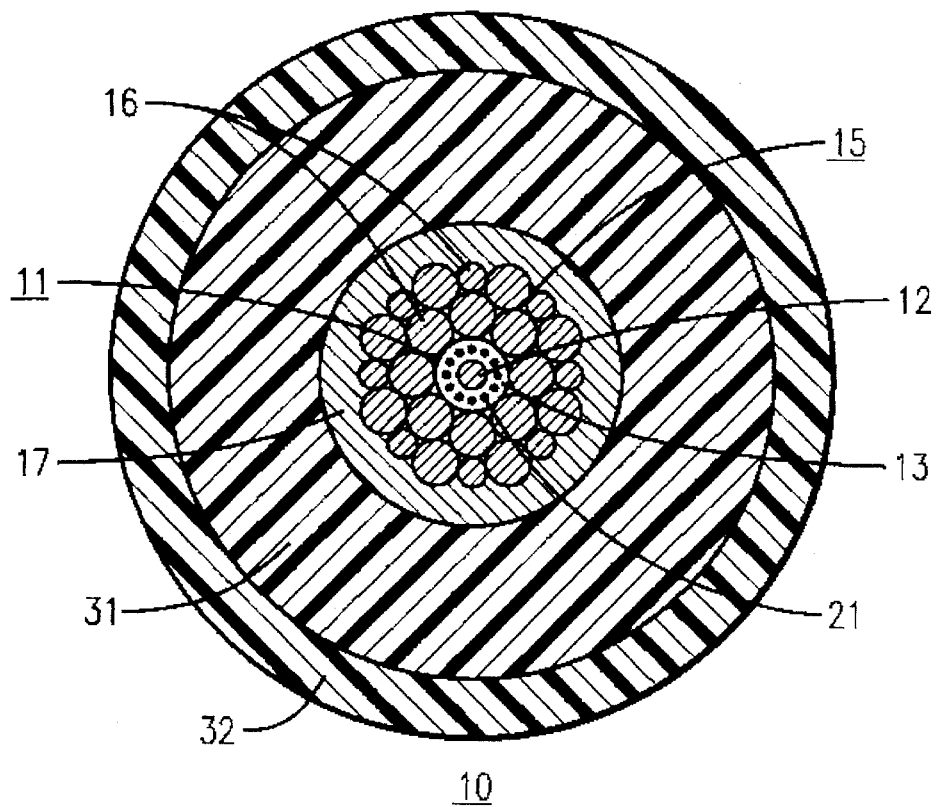
FIG. 1 is a cross-sectional view of one embodiment of an optical fiber cable constructed in accordance with the invention.

Referring now to the drawing, FIG. 1 depicts a section 10 of a submarine optical fiber cable constructed in accordance with the preferred embodiment of the present invention as designed for use in an undersea application. However, there are other communication applications and environments for which slightly varying cable designs may be more appropriate. It is envisioned that any such minor differences in the cable designs from the design disclosed as the preferred embodiment would not be deemed outside the scope of the present invention. In particular, there appear to be developing applications were the optical fiber assembly of the present invention alone, with no sheath system or specific strength components, could be used as the communication link. Therefore, while the preferred embodiment of the present invention described herein relates to an undersea cable design, it should be understood that the focus of the present invention is the optical fiber assembly itself and not necessarily the cable design into which it may be incorporated.

The cable core (designated 11), of the preferred embodiment, includes a first inner strength member 12 in the form of a central filament that is surrounded by and in contact with an annular insulating member 13, illustrative of the particular matrix bonding material used in accordance with the present invention and discussed in greater detail below. The inner strength member 12 may be a conductive wire, such as copper or steel, or alternatively may be a high-strength dielectric material such as glass ribbon or the spun polymer supplied under the designation "KEVLAR" by the Dupont Corporation. If desired, the outer diameter of the core insulating area 13 may be contacted by a protective sheath 14 (FIG. 2), illustratively of nylon or other relatively high melting point material.

A second outer strength member 15 (FIG. 1) of the cable is formed from a plurality of stranded steel wires 16 which are successively wrapped, in superposed layers as shown, around the outer diameter of the overall core, generally designated as element 11. In particular, the stranded steel wires 16 in the outer strength member may be distributed into an eight-wire inner layer directly in contact with the outermost core layer 14, with an additional sixteen-wire layer positioned immediately adjacent the outer periphery of the eight-wire inner strength layer.

To complete the composite inner conductor of the cable, a non-porous conductive jacket 17, as of aluminum or copper, may be formed directly over the outer layer of stranded wires 16. In addition to forming an efficient DC conducting path for powering optical repeaters (not shown) spaced at intervals along the cable, such solid jacket serves as a low-cost and highly effective moisture barrier for the optical transmission lines disposed in the cable. The jacket 17 further provides a positive clamping action on the surrounded steel wires 16 of the outer strength member, preventing any unraveling of the stranded wires during handling, storage or operation. (Advantageously, in the case where the jacket 17 is of aluminum, the seam of the jacket may be formed by a solid-phase or other cold welding process.)

Figure 2:
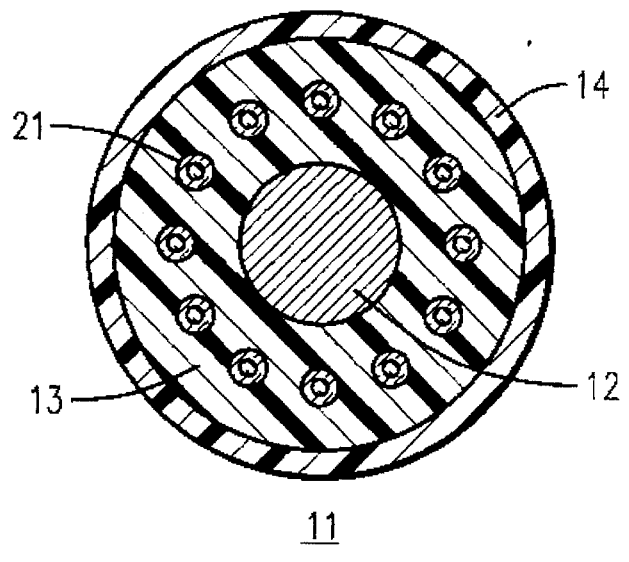
FIG. 2 is an enlarged cross-sectional view of the core region of the cable of FIG. 1.

As best shown in FIG. 2, the annular insulating portion 13 of the core 11 has embedded therein a plurality of conventional cladded glass-fiber optical transmission lines 21 (illustratively twelve in number). For ease of illustration, the lines 21 are shown distributed concentrically around the central strength member 12; but it will be understood that any convenient distribution of the fibers, whether in a number of lines of fiber or merely a single line, may be employed within the portion 13. In other words, it is envisioned that the individual fibers could be arranged in a variety of different configurations and embedded in the radiation curable elastomeric material disclosed and claimed herein without escaping the scope of the present invention.

Now turning more specifically to the particular material selected and disclosed herein as the elastomeric bonding material 13 and the desired attributes such a material should have for effective use in the communication applications mentioned above. As stated earlier, the elastomeric bonding material of this application is intended to adequately secure a plurality of optical fibers while also providing ready and convenient access to any of the individual fibers or groups of fibers without damaging the fibers being accessed or any of the adjacent fibers. In particular, the elastomeric bonding material of the preferred embodiment of this invention fills interstices between adjacent fibers, and groups of fibers, and extends throughout and about the array of optical fibers in a manner that substantially fills the annular insulating area 13. A bonding material suitable for use as described herein is disclosed in commonly assigned U.S. Pat. No. 4,900,126 issued to Jackson et al. on Feb. 13, 1990. However, the material is disclosed for establishing a relatively thin layer about an array of fibers, preferable in a ribbon-like configuration and does not directly address the problems overcome by the present invention.

In a preferred embodiment, the array of optical fibers includes a cylindrical array of longitudinally extending parallel optical fibers with elastomeric material being disposed along each side of the array to provide a substantially secure arrangement or configuration. The el astomeric material also fills the interstices formed between planes which extend across the cylindrical array and which are adjacent optical fibers. The optical fibers in the array are preferably not contiguous to each other.

In another embodiment, each of the individually coated optical fibers is covered with a release agent which has an affinity for the elastomeric material or the fiber coating or the colorant material on the fiber coating which is controlled to be relatively low. As a result, a colorant material, typically an ink, on an outer surface of each optical fiber is not removed when the elastomeric material is removed to access a fiber or fibers. Further, the use of a release agent makes it possible to adjust the interfiber coupling to be optimal with respect to the robustness of the fiber configuration or array and the ease of single fiber access.

In a further embodiment, the elastomeric material which fills the interstices is the same as that which extends around the outer periphery of the fiber configuration or array. However, in another embodiment, a first elastomeric material which fills the interstices has a modulus which is substantially less than that of a second elastomeric material which surrounds or covers the array. The dual coatings in this last-described embodiment can be applied in a single coating apparatus or in tandem coating operations.

In order to achieve or provide the desirable attributes as discussed above, the selected elastomeric material should exhibit certain characteristics or properties. One important property of the elastomeric material is its modulus as related to temperature. Ideally, it is desired that the glass transition temperature of the elastomeric material be below −40° F. or above 180° F., that is, the modulus does not change significantly in the expected temperature range of operation. It is instructive to relate that modulus to the moduli of the coating materials for the optical fibers. As presently practiced by most of the industry, each optical fiber is enclosed typically in two coatings, although it may be enclosed in only one. In such dual coating systems, the inner coating is relatively soft and has a modulus of about 1 MPa at a room temperature. This inner coating is used to cushion the optical fiber and to prevent microbending losses. Over the inner coating layer is disposed an outer coating layer which typically has a modulus of about 1 GPa at room temperature. The outer layer of coating material is used to provide the optical fiber with mechanical protection and some strength.

In contrast to the polyether polyester elastomers disclosed by the prior art, such as HYTREL™, the radiation curable material selected in accordance with the present invention allows the above-stated end-use properties to be balanced or tuned as desired for the particular application ultimately envisioned. The ability to balance or tune the material disclosed herein is attributable to the particular combination of components chosen for use in the specific bonding material of the present invention.

In the structure of this invention, the elastomeric material used as the annular insulating layer 13 has a modulus which falls between the moduli of the inner and outer layers of coating materials as often used on a dual coated fiber. Accordingly, the elastomeric material 13 is preferably a curable material such as a radiation curable material. More specifically, the elastomeric material 13 preferably is a UV curable bonding material having a modulus which is greater than about 1 MPa but which is less than about 1 GPa. The modulus must be sufficiently high to provide suitable mechanical integrity, but it cannot be so high as to affect adversely the loss performance of the optical fiber or access to the fiber by a crabsperson for splicing purposes, for example. The elastomeric material 13 also must hold together the optical fibers, but at the same time allow for interfiber movement. A higher modulus material may be used as the elastomeric material 13 when each optical fiber has dual coatings with the primary, inner coating layer comprising a relatively low modulus material. However, while a UV curable material is described herein as the preferred embodiment, any known type of curing may be used in accordance with the present invention. Some of the known curing alternatives envisioned by the present invention include the use of thermal, electron beam and/or ultrasonic energy. In particular, a thermally curable material such as a polyimide based material or any thermally induced condensation polymerization may be used.

A suitable UV curable material is a mixture comprising a resin, a diluent, and a photoinitiator. The resin may include a diethylenic terminated resin synthesized from a reaction of a hydroxyalkylacrylate with the reaction product of a polyester of polyether polyol of molecular weight of 1000 to 6000 Dalton with an aliphatic or aromatic diisocyanate, or a diethylenic terminated resin synthesized from the reaction of glycidylacrylate with a carboxylic terminated polyester or polyether of molecular weight 1000 to 6000 Dalton. The diluent may comprise monofunctional or multifunctional acrylic acid esters having a molecular weight of 100 to 1000 Dalton or N-vinylpyrolidinone. For the photoinitiator, the composition may include ketonic compounds such as diethoxyacetophenone, acetophenone, benzophenone, benzoin, anthraquinone, or benzil dimethyl ketal. In a typical composition, the bonding material may include 50 to 90 weight percent resin, 5 to 40 weight percent diluents, and 1 to 10 weight percent photoinitiator. Other bonding materials may include a methacrylate, a UV curing epoxide or an unsaturated polyester.

The bonded fiber configuration of this invention is advantageous from several standpoints. First, because of its thickness and because of its modulus, the elastomeric material permits interfiber movement in the same fiber configuration or grouping. Also, the selected elastomeric material does not affect adversely the environmental performance of the optical fibers. Additionally, accessing the individual fibers is relatively easy and does not require the use of complex mechanical tools nor special chemical treatments in order to facilitate the desired access to one or more of the fibers within a particular fiber grouping or configuration.

It is also desirable that the configuration of bonded fibers have several other attributes. As alluded to earlier, typically, a colorant material is provided on the surface of the outermost coating layer of each optical fiber coating material or in the secondary coating material of the optical fiber itself. A color coded arrangement of optical fibers is of great help to craftspersons in the field. It should be apparent that when colored optical fibers are embedded in a bonding material to form a bonded grouping of optical fibers, the fibers should be accessible without the loss of color. That is, when the bonding material is removed to access the optical fibers, the colorant material should not be removed from the optical fibers to an extent that the color identification is obfuscated. The specific material of the bonded fiber configurations of this invention may be selected to have an interfacial bonding characteristic so that the bond interface of the material to the colorant material is predictably weaker than the bonding interface of the colorant material to the outermost coating on the optical fiber.

An example of an undesirable bonding material is one identical to the secondary coating on the optical fiber. In that case, the bond strengths between the colorant material and the fiber secondary coating and between the bonding material and the colorant material would be equal and bond failure would be unpredictable, causing colorant material to be removed frequently from the fiber coating during the accessing of the fibers. Advantageously, it has been found that the bonding materials of this invention do not remove colorant material from the surface of the optical fibers to a degree which destroys the identity pattern of the optical fibers within the fiber grouping.

In another embodiment, the coloring on the fiber surface can be preserved by applying a release agent to an outer surface of each of the optical fibers, prior to the application of a bonding material to an arrangement of the optical fibers. The release agent creates a weak boundary layer at the interface of the colorant material to the bonding material. In a preferred embodiment, the release material may be a Teflon® dry lubricant, for example.

The use of a release agent covering for the coating optical fibers may be advantageous in another way. The bonding material may have a modulus which is so high in order to provide suitable bonding strength for the array that the optical fibers must be coated with a release agent to facilitate the accessing of the individual fibers in the field.

Generally then, the preservation of the color identification when the individual fibers are accessed is accomplished by balancing the modulus and adhesive bond strength against that need. If the modulus and bond strength are relatively high in order to meet requirements for mechanical properties, then either a release coating may be provided for each optical fiber or the bonding material is caused to be such that its polarity with respect to that of the colorant material or of the outer coating of the optical fiber ensures an easy release. In other words, the bonding material may be fine-tuned to enhance the release. Accordingly, the modulus of the bonding material and its bonding to the color coded optical fiber is such that interfiber movement is allowed and the fibers can be accessed individually without removing the colorant material from the fiber while providing suitable mechanical properties for the fiber arrangement.

The present invention has purposely referred to fiber configurations or groupings which for the most part are fairly generally described and it should be apparent that many arrangements are contemplated within the scope of the present invention. A few such configurations will now be discussed in greater detail. For example, in FIG. 3, there is shown a bonded array which is designated generally by the numeral 100. The array 100 includes four optical fibers 21—21, each being provided with a colorant material and each of which may include a release coating 102. A center void 103 defined by the four fibers may be provided with a fibrous member 104 which may be a strength member. As can be seen, the array 100 includes a bonding material 106 which acts to hold together the optical fibers. The bonding material 106 fills voids between adjacent fibers, but most likely does not enter the center void 103. However, it should also be noted that for the particular application envisioned does not require the addition of a central strength member, it may be omitted and thereby intentionally allowing void 103 to become filled with the bonding material as well. In yet another possible feature, the bonding material 106 may be defined by an envelope 108 which is arranged to cause the thickness of matrix material covering an outermost portion of each fiber not to exceed a value of about 25 μm for use in applications where overall dimensions of the fiber grouping are critical.

Figure 4:
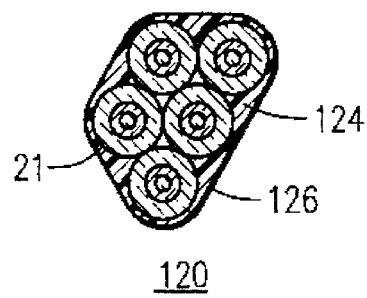

FIG. 4 depicts a slightly different fiber core embodiment generally denoted as element 120. In particular, five optical fibers 21—21 are arranged in a substantially random, non-cylindrical array. The various fibers are held together by bonding material 124 and may be physically defined by an envelope 126. This configuration is included herein to illustrate that a fiber core arrangement structurally maintained by the bonding material of the present invention may take any number of different shapes, including both cylindrical and non-cylindrical arrays, both with or without central strength members, and still be deemed within the scope of the present invention. Other basically cylindrical configurations may employ as few as three optical fibers oriented to exhibit a substantially circular overall cross-section. Additionally, as with other designs discussed herein a central strength member is optional and may be included or not based on the envisioned demands of the specific application. It is believed and intended that the present application encompass and protect each of these slightly different arrangements or configurations within the general scope of the present application.

Figure 5:
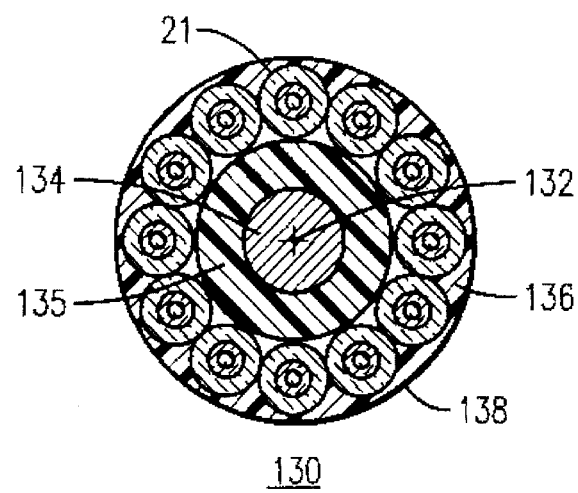

A further embodiment of a fiber configuration of this invention is shown in FIG. 5 and is designated by the numeral 130. In this embodiment, a plurality of optical fibers 21—21 are arrayed about a central axis 132 with the axes of the fibers defining a circle. A strength member 134 may be disposed in a center void formed by the optical fibers. The strength member 134 may be made of a metallic or a non-metallic material. Also, it may be rod-like or it may be a fibrous material which may be provided with a colorant material for purposes of identification. Also, the strength member 134 is enclosed in a plastic buffering material 135 and may be provided with an adhesive coating to facilitate assembly of the optical fibers therewith. The optical fibers 21—21 are held together in a bonding material 136 which fills interstices between adjacent optical fibers. As can be seen, the bonding material 136 is applied to cause it to be contained within an envelope 138 which is circular in configuration. The optical fibers may extend parallel to the longitudinal axis of the member 134 or be twisted thereabout with unidirectional or alternating directional twists.

Figure 3:
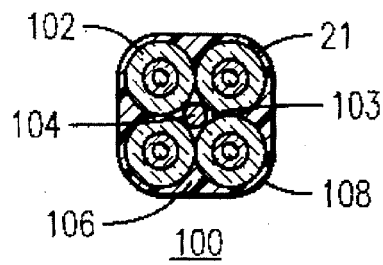
FIGS. 3–5 are end sectional views of other bonded arrays or fiber configurations in accordance with the present invention.

In each of FIGS. 3, 4 and 5, the modulus of the bonding material and its bonding to the optical fibers are such that interfiber movement is allowed and such that individual fibers may be accessed without compromising the mechanical properties of the array. Further, the envelope which circumscribes each array is such that the distance from the envelope to outermost peripheral points of the optical fibers does not exceed about 25 μm. Further, in the embodiments shown in FIGS. 3 and 4, the optical fibers in each array are straight and parallel to each other and to the longitudinal axis of the array.

Should a relatively high modulus bonding material be used, a release coating may be required in order to assure accessing without obfuscation of the color identification. In the alternative, the bonding material may be fine-tuned to cause its polarity to be sufficiently different from that of the colored, coated optical fiber so that accessing is facilitated. On the other hand, if the modulus is sufficiently low, no release provisions may be necessary. Also, the envelope is structured to avoid nesting and the low values of cover thickness conserve materials.

Returning now to the discussion of the overall cable design and specifically the sheath system desired to protect the inner fiber core regardless of the particular physical arrangement or configuration employed. As suggested above, the jacket 17 surrounding the steel wires 16 operates as a moisture barrier for the optical fibers 21 within the annular insulating member 13. This avoids the necessity of providing a separate outer moisture barrier.

A conventional annular polyethylene insulator 31 (FIG. 1) is formed over the outer diameter of the jacket 17. If desired for added toughness of the cable, a separate polyethylene jacket 32, of higher density than the insulator 31, may be formed over the insulator 31. Under ordinary circumstances, a separate metallic outer conductor can be dispensed with in favor of a sea return.

The use of a solid tubular moisture barrier surrounding and in contact with the steel wires 16 can provide still another advantage when the depicted cable section is terminated, at the associated optical repeater, in a so-called "gimbal-less" coupling or the like. In this type of coupling, the front end of the cable section is brought all the way up to the repeater without the necessity of exposing the stranded steel wires of the strength member. In such cases, since the moisture barrier of the present design is at the inner conductor, it is much simpler to maintain a continuous moisture shield into the repeater than in designs requiring a separate outer moisture barrier.

Without in any way affecting the generality of the foregoing description, Table I below presents typical sizes of the various elements of the undersea optical fiber cable 10:

TABLE I

| | |
|---|---|
| Diameter of central steel wire | 1.0 mm |
| Outer diameter of annular insulating core member | 2,563 mm |
| Outer diameter of optical fiber (uncoated) | 125 μm |
| Diameter of each stranded steel wire surrounding the annular insulating core member | 1.105–1.554 mm |
| Outer diameter of 8-wire inner layer of stranded steel wires | 5.671 mm |
| Outer diameter of 16-wire outer layer of stranded steel wire | 7.882 mm |
| Outer diameter of aluminum moisture barrier | 10.5 mm |
| Outer diameter of low-density polyethylene insulator | 21.0 mm |
| Outer diameter of high-density polyethylene jacket | 25.0 mm |

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. An optical fiber assembly comprising:
   an annular insulating core member formed from a radiation curable elastomeric material surrounding and embedding a plurality of optical fibers and maintaining the fibers in a predetermined configuration relative to each other.

2. The optical fiber assembly as defined in claim 1, further comprises at least one color-identified optical fiber wherein at least one optical fiber includes a color identification material applied to an outer surface thereof and wherein the bonding characteristics of said elastomeric material are sufficiently different from that of the color identification material of each said optical fiber to facilitate accessing of the individual fibers.

3. The optical fiber assembly as defined in claim 2, wherein the modulus of said elastomeric material at room temperature and its bonding to each color identified optical fiber being such as to hold together said fiber configuration while allowing interfiber movement and to facilitate the exposure of a selected number of individual optical fibers upon the application of peeling forces between the elastomeric material and an optical fiber without obfuscating the color identification material of the optical fibers while maintaining the desired physical integrity for the remaining fiber configuration.

4. The optical fiber assembly as defined in claim 2, wherein the color identification material is a solvent based ink which is applied to an exterior surface of each optical fiber.

5. The optical fiber assembly as defined in claim 2, wherein the color identification material is an ink which is curable by exposure to ultraviolet energy and which is applied to an exterior coating surface of each optical fiber.

6. The optical fiber assembly as defined in claim 2, wherein said color identification material comprises a constituent of an outermost coating layer of each said optical fiber.

7. The optical fiber assembly as defined in claim 1, wherein each of said optical fibers includes a coating of a release material which contacts said elastomeric material to facilitate the separation of elastomeric material from an optical fiber by the application of suitable peeling forces along the interface between said elastomeric material and a selected optical fiber having the release coating.

8. The optical fiber assembly as defined in claim 1, wherein the modulus of said elastomeric material is fine-tuned to be sufficiently high to provide required mechanical properties for said fiber configuration and the adhesion characteristics of the elastomeric material to the optical fibers are such as to cause the elastomeric material to have an affinity for the optical fiber which is sufficiently low to allow separation of the optical fiber from the elastomeric material by the application of suitable peeling forces by a craftsperson.

9. The optical fiber assembly as defined in claim 1, wherein said elastomeric material is radiation curable when exposed to at least one form of energy selected from the group consisting of ultraviolet, thermal, electron beam and ultrasonic.

10. The optical fiber assembly as defined in claim 1, wherein a release agent is interposed between each said optical fiber and said elastomeric material.

11. The optical fiber assembly as defined in claim 1, wherein said curable elastomeric material has a modulus at room temperature which is in the range of about 1 MPa–1 GPa.

12. An optical fiber cable comprising:
   an annular insulating core member formed from a radiation curable elastomeric material surrounding and embedding a plurality of optical fibers and maintaining the fibers in a predetermined configuration relative to each other;
   a strength member system supporting the annular insulating core member; and
   a sheath system enclosing the core member and the strength member system.

13. The optical fiber cable as defined in claim 12, wherein each optical fiber includes a color identification material applied to an outer surface thereof and wherein the bonding characteristics of said elastomeric material are sufficiently different from that of the color identification material of each said optical fiber to facilitate accessing of the individual fibers.

14. The optical fiber cable as defined in claim 12, wherein the modulus of said elastomeric material is fine-tuned to be sufficiently high to provide required mechanical properties for said fiber configuration and the adhesion characteristics of the elastomeric material to the optical fibers are such as to cause the elastomeric material to have an affinity for the optical fiber which is sufficiently low to allow separation of the optical fiber from the elastomeric material by the application of suitable peeling forces by a craftsperson.

15. The optical fiber cable as defined in claim 12, wherein the sheath system further comprises a non-porous moisture-proof conductive tube surrounding and in contact with at least a portion of the strength member system, said conductive tube preventing the ingress of any moisture to said core member when said cable is in an undersea environment and being adapted for high power transmission.

16. The optical fiber cable as defined in claim 15, in which the conductive tube is formed from aluminum.

17. The optical fiber cable as defined in claim 15, in which the conductive tube is formed from copper.

18. The optical fiber cable as defined in claim 15, further comprising a first low-density annular polyethylene body surrounding and in contact with the conductive tube.

19. The optical fiber cable as defined in claim 18, further comprising a second high-density annular polyethylene body surrounding and in contact with the first body.

20. The optical fiber cable as defined in claim 12, in which the strength member system comprises steel wires distributed in first and second substantially concentric layers around the outer diameter of the annular insulating core member.

* * * * *